United States Patent

Sundseth

[11] Patent Number: 5,096,308
[45] Date of Patent: Mar. 17, 1992

[54] BALL UNIT

[76] Inventor: Jarl Sundseth, Rothendaschwet 12a, 8162 Schliersee, Fed. Rep. of Germany

[21] Appl. No.: 623,038

[22] Filed: Dec. 6, 1990

[30] Foreign Application Priority Data

Dec. 19, 1989 [DE] Fed. Rep. of Germany ....... 3941906

[51] Int. Cl.⁵ .................. F16C 24/04; B60B 33/08; B65G 13/00
[52] U.S. Cl. .......................... 384/49; 76/26; 193/35 MD
[58] Field of Search .............. 384/49; 16/24–26; 193/35 MD

[56] References Cited

U.S. PATENT DOCUMENTS

| | | | |
|---|---|---|---|
| 1,963,956 | 6/1934 | Craig | 384/49 X |
| 3,466,697 | 9/1969 | Cain | 16/26 |
| 3,739,894 | 6/1973 | Hinman | 16/26 X |
| 4,382,637 | 5/1983 | Blackburn et al. | 384/49 |
| 4,689,847 | 9/1987 | Huber | 16/24 X |
| 4,696,583 | 9/1987 | Gorges | 384/49 |
| 4,778,041 | 10/1988 | Blaurock et al. | 193/35 MD |
| 4,871,052 | 10/1989 | Huber | 16/26 X |

FOREIGN PATENT DOCUMENTS

| | | |
|---|---|---|
| 249648 | 7/1912 | Fed. Rep. of Germany . |
| 7104597 | 2/1971 | Fed. Rep. of Germany . |
| 7333692 | 9/1973 | Fed. Rep. of Germany . |
| 7337939 | 10/1973 | Fed. Rep. of Germany . |
| 1297185 | 5/1962 | France ................. 193/35 MD |

Primary Examiner—Thomas R. Hannon
Attorney, Agent, or Firm—Eckert Seamans Cherin & Mellott

[57] ABSTRACT

Ball units for conveyor systems are known in which a load-bearing ball is seated in an essentially radially symmetric bearing unit having ball bearings in a bearing shell. The load-bearing ball is held in the bearing unit by a securing apparatus. The bearing unit has a supporting structure that enables the bearing unit to be fixed in an opening of a carrier plate in such a way that it can support a load. Detents are provided to lock the unit in the opening against the load direction. It is suggested that the bearing shell should be constructed integrally with the supporting structure as a semielastic formed element.

10 Claims, 4 Drawing Sheets

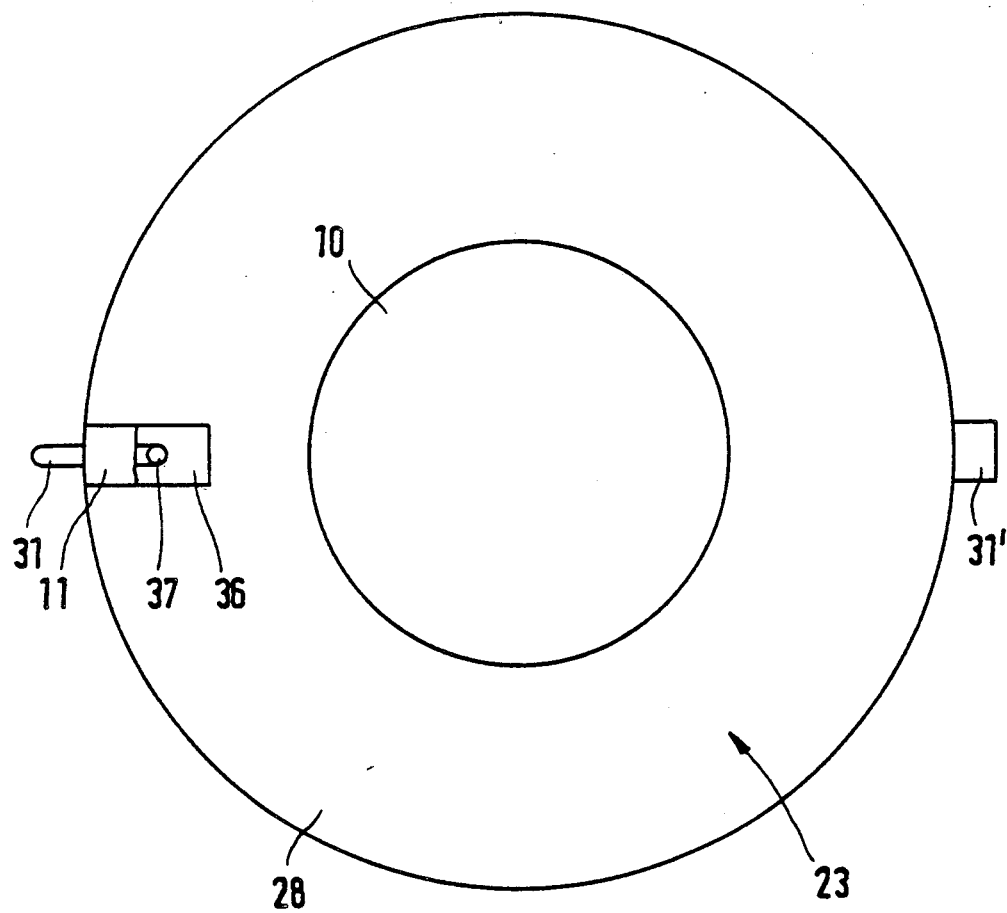

BALL UNIT

DESCRIPTION

The invention involves a ball unit for conveyor systems.

Ball units of this sort are used in conveyor systems, many identical ball units being mounted in "ball mats" to form a field over which objects to be transported, such as containers, can be pushed. Such ball units, in particular ball units of the kind described here, are commonly employed in cargo aircraft, where low weight and high reliability are important considerations.

From the German patent applications DE-OS 3507945 or DE-OS 805494 ball units of this type are known.

In both of these ball units the bearing units are seated against the supporting structure in an elastic mounting, by way of spring arrangements, to avoid damage due to excessive load impacts.

It is considered a disadvantage of the known ball units that their construction is complicated, so that they are vulnerable to damage, and their weight is high.

The present invention is based on the problem of modifying a ball unit of the kind described above in such a way as to achieve increased stability due to simplified construction with a simultaneous decrease in weight.

In the invention this problem is solved by constructing the bearing shell in one piece with the supporting structure as a formed element, in particular as a deep-drawn element. The actual load-bearing construction thus consists of only a single part, which can be made extremely stable because it is shaped by the deep drawing process, without requiring a great expenditure of material. Hence the weight of the load-bearing structure remains small. Furthermore, an elasticity of the arrangement is achieved, so that sharp impacts are attenuated. Because only a few parts are required for the entire assembly, only a few parts can break down. Therefore, the reliability of this arrangement is high.

The formed element is preferably shaped so that its upper part, next to the load, is an essentially cylindrical section of larger diameter, in which there is room for a ring-shaped securing apparatus by which the ball is retained in the bearing shell. This securing apparatus comprises an inward directed lip, which comes into contact with the surface of the ball under sideways loading. A flange section projecting outward lies on the upper surface of the supporting structure, which itself is flange-shaped. The diameters of the two parts are made the same. The securing apparatus is made of a stable material such as aluminum or reinforced plastic, so that even forceful lateral impacts will not damage the securing apparatus.

The ring-shaped securing apparatus is retained in the formed element by an elastic holding device so that the parts can be separated and the load-bearing ball exchanged.

A particularly simple and nevertheless robust construction is achieved when the holding device consists of a spring washer, seated in a groove on the circumference of the ring-shaped securing apparatus so that the spring tension forces it outward. The spring washer preferably extends over ca. ¾ of the circumference. On the inner surface of the formed element, about at the level of the groove encircling the securing apparatus (when the latter is seated in the formed element), there is a retaining shoulder. When the unit is assembled, therefore, the spring washer spreads out below the retaining shoulder, the depth of which is small enough that a considerable part of the spring washer remains within the groove. The securing apparatus is thereby prevented from slipping out of the formed element.

To lock the formed element within the carrier plate or the ball mat, elastic detents like those in the known ball units are provided, so that the unit can be set in place and removed. Preferably at least one elastic detent is positioned in such a way that it projects out through an opening in the formed element. This opening is situated below the upper flange of the formed element, which forms the supporting structure. Hence this flange is continuous around the whole formed element, which considerably increases the stability of the arrangement (against collapse). When the holding device for the securing apparatus in the formed element consists of a spring washer as described above, the construction is made especially simple by providing one end of the spring washer with a U-shaped hook that bends outward at right angles, through the opening in the formed element. The end of the spring washer is then bent upward and is accessible through an indentation in the securing apparatus that opens upward. This arrangement facilitates removal of the ball unit from the carrier plate.

Other preferred embodiments of the invention derive from the dependent claims and the following description of exemplary embodiments thereof, which are explained in more detail with reference to the drawings, wherein:

FIG. 5 shows a plan view from above of the ball unit according to FIG. 3, and

Figure 1:
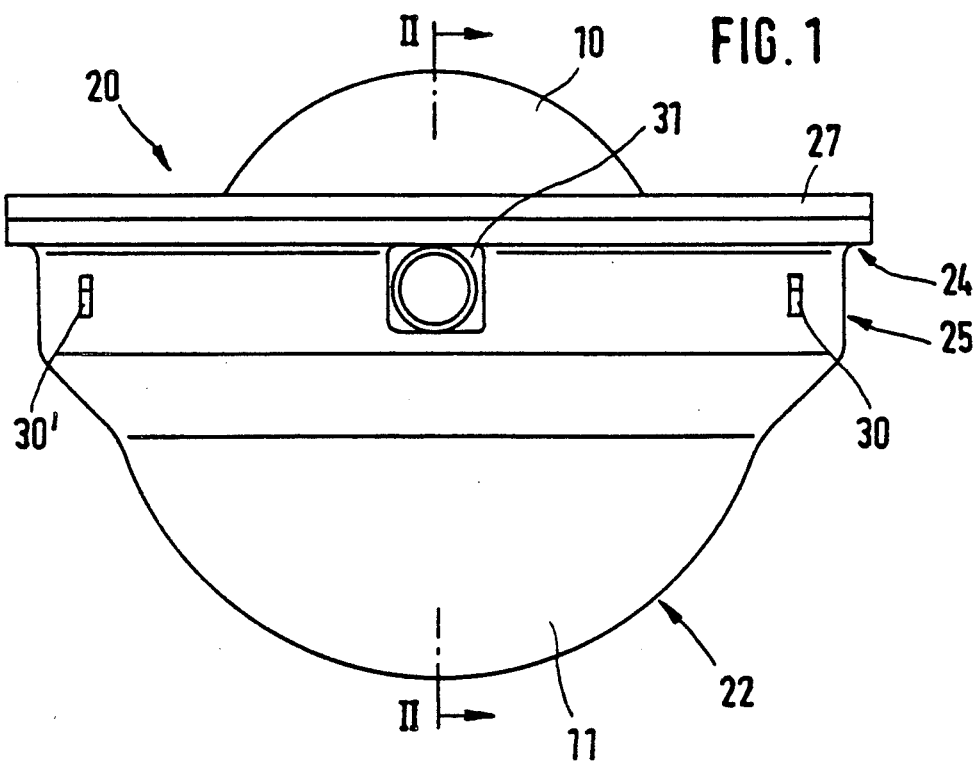
FIG. 1 shows a side view of a first embodiment of the ball unit.
Figure 2:
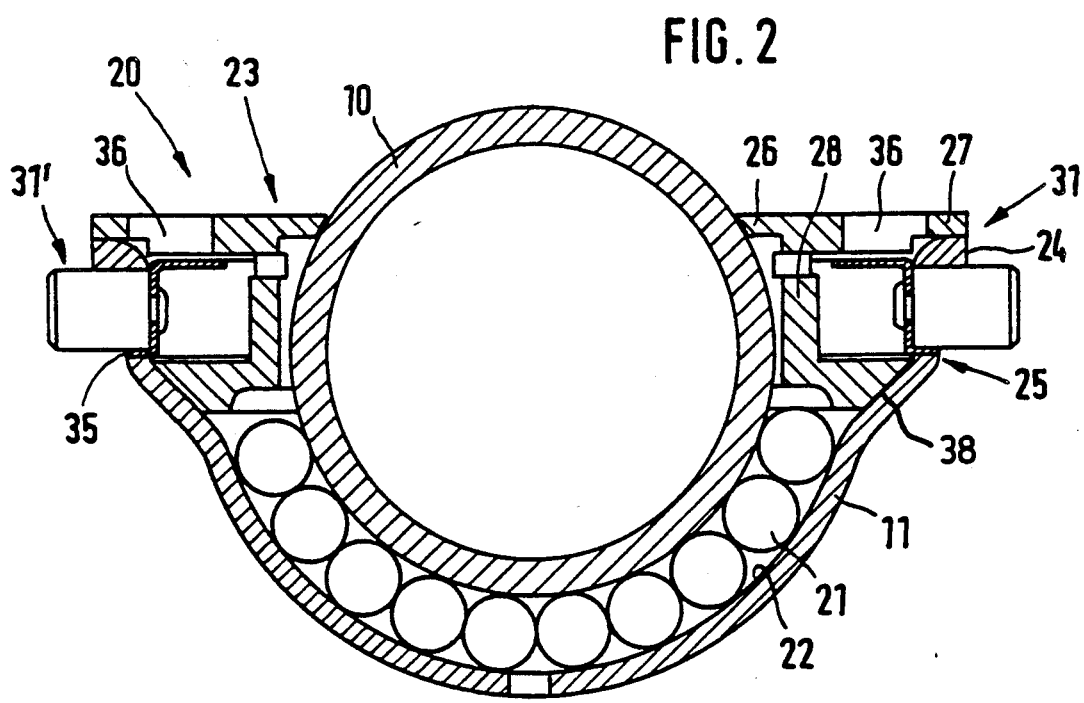
FIG. 2 shows a section through the ball unit according to FIG. 1 along the line II—II.

As shown in FIGS. 1 and 2, the first embodiment of the invention comprises a load-bearing ball 10, seated in a bearing unit 20. The bearing unit 20 comprises a formed element 11, which consists of a lower bearing shell 22 in the shape of a hollow section of a sphere, in the middle an essentially cylindrical section 25, and an upper supporting flange 24 that extends outward and serves to support the ball unit in a carrier plate under load.

The load-bearing ball 10 is seated in the bearing shell 22 on ball bearings 21, so that it can rotate. The balls 10 and 21 can be made, for example, of a material according to AISI 440 C.

To retain the load bearing ball 10 within the formed element 11, a securing apparatus 23 is set into the cylindrical section 25. The securing apparatus 23 comprises a ring component 28 bearing an upper, inward projecting lip section 26, which surrounds a concentric opening through which the upper part of the load-bearing ball 10 protrudes. The diameter of this opening is smaller than that of the load-bearing ball 10.

The ring component 28 in addition bears a flange section 27 that extends outward and lies on the upper edge of the supporting flange 24, the outer edge of the flange section being flush with that of the supporting flange.

The outside diameter of the ring component 28 corresponds essentially to the inside diameter of the cylindrical section 25 of the formed element 11. At its lower edge the ring component 28 has an outer chamfer 38, which rests on the inner surface of the formed element 11 in the (conically tapering) transition zone between the cylindrical section 25 and the bearing shell 22.

The ring component 28 is secured within the formed element 11 by elastic holding devices 30,30′.

To fasten the ball unit in a carrier plate 40 (see FIG. 3), detents 31,31′ are provided, which are mounted in the ring component 28 with spring loading and project through openings 35 in the cylindrical section 25 of the formed element 11. The supporting flange 24 is, therefore, intact around the entire circumference of the formed element 11. The detents 31,31′ slot into correspondingly shaped recesses in the carrier plate 40, which are not shown in the figures and are known per se.

In the region of the detents 31 there is an indentation 36 in the ring component 28, which opens upward. Through this indentation 36 a tool can be inserted to pull back the detents 31 in order to remove the ball unit from a carrier plate.

Figure 3:
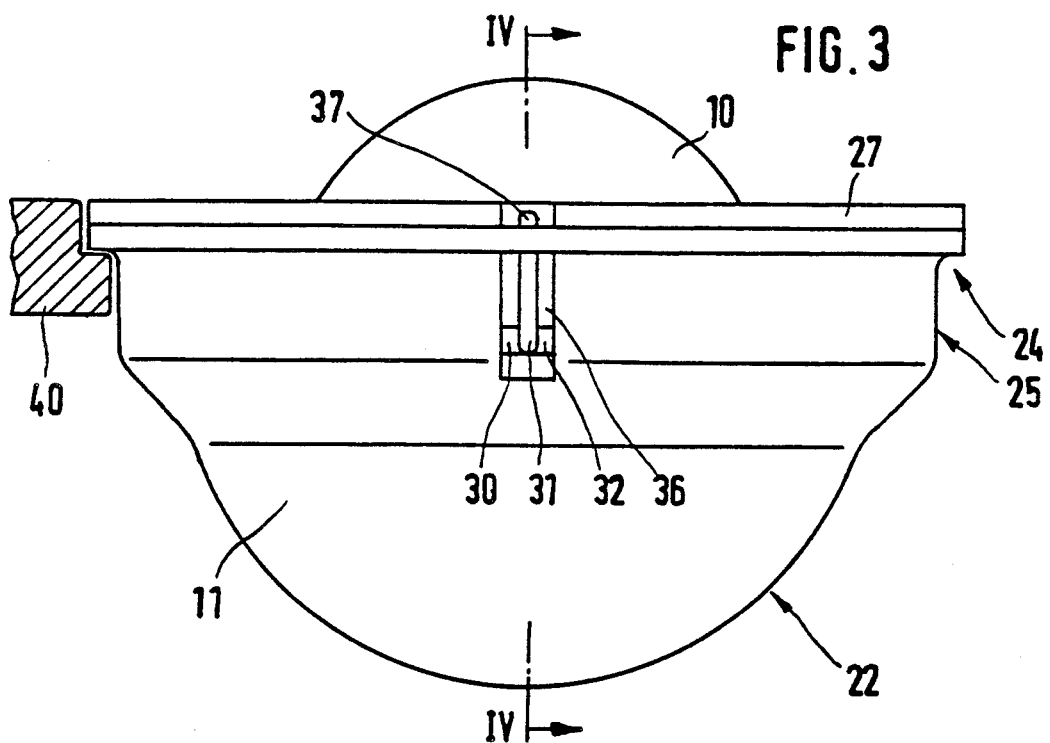
FIG. 3 shows a side view of a further preferred embodiment of the invention.
Figure 4:
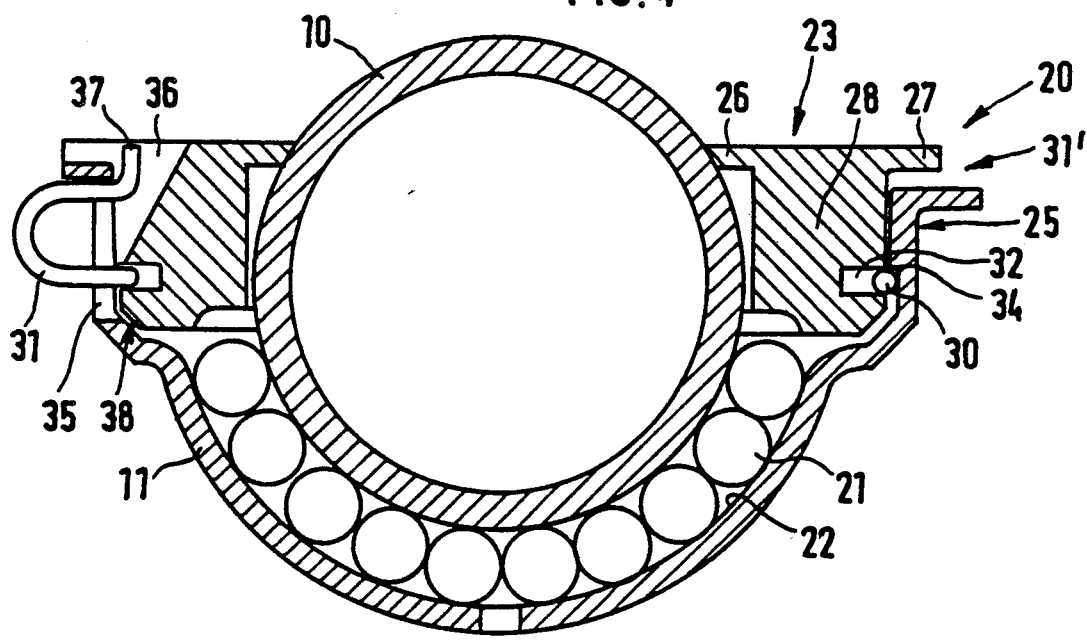
FIG. 4 shows a section through the ball unit according to FIG. 3 along the line IV—IV.

In the following, a further, especially preferred embodiment of the invention is explained with reference to FIGS. 3-5. Here parts of the same shape and with the same actions are identified with the same numbers and are therefore not again described in detail.

The differences between this embodiment of the invention and the embodiment described above reside chiefly in the configuration of the holding device 30 to retain the ring component 28 in the formed element 11 and in the nature of the detents 31.

In this embodiment of the invention, a groove 32 is provided around the outer circumference of the ring component 28 at the level of the cylindrical section 25 of the formed element 11. At the level of the upper edge of the groove 32 the formed element 11 is shaped with an inward-projecting shoulder 34.

A spring washer 30 is set into the ring groove 32, the spring tension forcing it outward. This spring washer 30 extends over about 270° of the circumference. In this position, the spring washer 30 fits snugly against the inner surface of the cylindrical section 25 of the formed element 11 and thus lies directly below the retaining shoulder 34. Under the action of a force that tends to lift the ring component 28 upward, out of the formed element 11, the spring washer 30 is caught between the retaining shoulder 34 and the lower edge of the groove 32, holding the two parts together.

One end of the spring washer 30 is bent outward by 90° in the plane of the washer, and curved by 180° up and back again to form a U-shaped section. The end of the U-shaped section in turn is bent upward by 90° in the plane of the U-shaped section.

This U-shaped section forms a detent 31, which extends out through a slit-shaped opening 35 in the cylindrical section 25 of the formed element 11.

Above the groove 32 in the ring component 28 there is an indentation 36 in the ring component 28, in which the handle end 37 of the of the spring washer 30 is seated. The indentation 36 is open upward, so that for removal of the ball unit the handle end 37 can be pulled inward with a tool until the curve of the U-shaped detent 31 has moved in far enough that the remaining necessary movement is effected by levering the unit out.

Diametrically opposite this one movable detent 31 is a second, fixed locking device 31′, which consists of a tongue-shaped projection of the formed element 11. This tongue-shaped section does not completely interrupt the upper flange edge, so that even in this preferred embodiment of the invention the stability of the formed element against collapse is preserved.

An essential feature of both embodiments of the invention, therefore, is the one-piece construction of the part (formed element 11) that bears the load forces and transmits them to the surrounding carrier plate 40.

Figure 7:
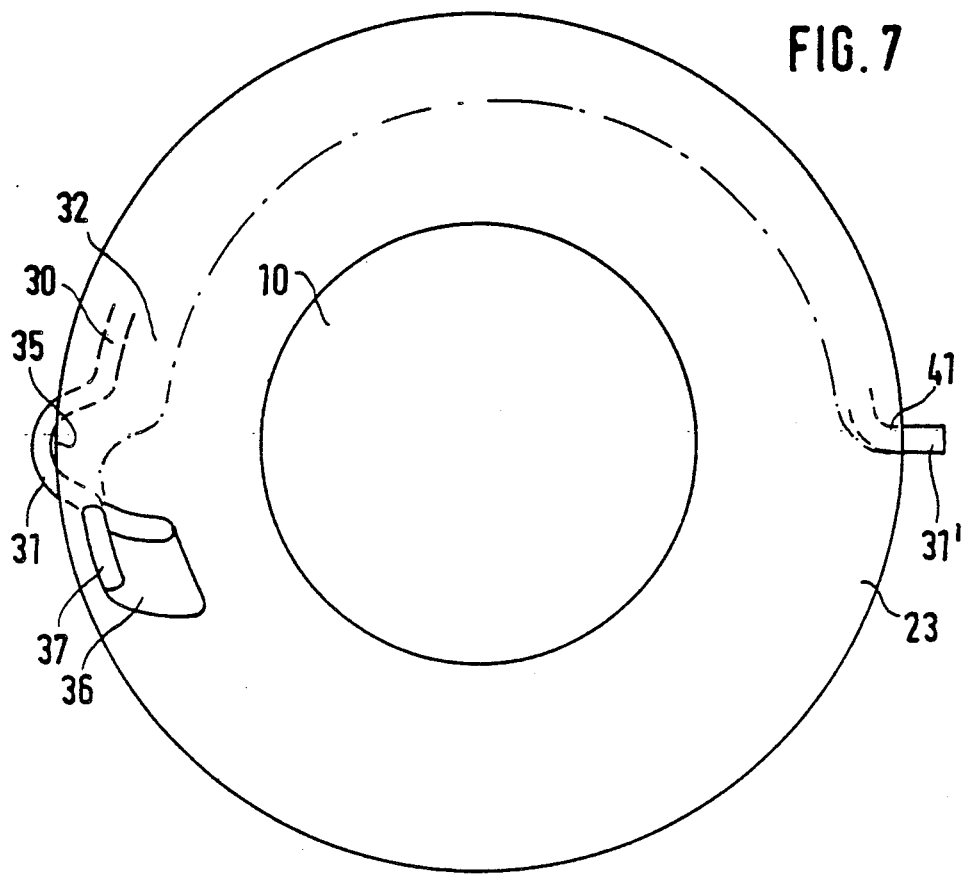
FIGS. 6 and 7 show a further preferred embodiment of the invention in illustrations like those of FIGS. 4 and 5.
Figure 6:
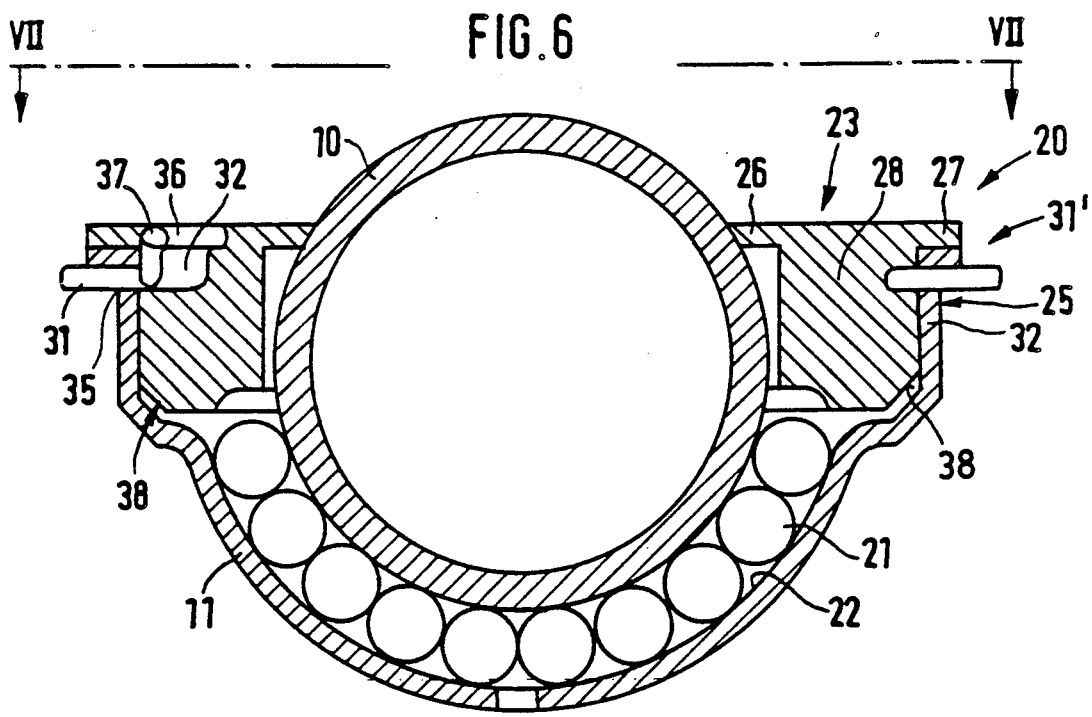

The embodiment of the invention illustrated in FIGS. 6 and 7 is similar to the embodiments previously described. Here, however, the spring washer 30 is not bent into a U shape in the vertical plane but rather, in the region that forms the detent 31, lies in the same plane as the remainder of the spring washer. Accordingly, the opening 35 is merely slit-shaped.

The handle end 37, in turn, is bent first upward and then horizontal.

The (other) end of the spring washer 30 is bent radially outward by 90° and projects out through a further opening 41 in the cylindrical section 25 of the formed element directly below the flange. This end forms the second locking device 31′. In this embodiment, therefore, the spring washer 30 passes essentially halfway around the circumference. With this arrangement, as with the preceding ones, secure retention of the ring component 28 within the formed element 11 is guaranteed.

The groove 32 can, as indicated by a dot-and-dash line in the embodiment shown in FIG. 7, be made asymmetric with respect to the center of the ball unit. At its end next to the further opening 41, the groove 32 is relatively shallow, holding the spring washer so tightly that it is practically impossible to displace. From this position toward the opening 35, the groove becomes progressively deeper, so that the detent 31 can be withdrawn completely into the groove 32 in the ring component 28 by means of the handle end 37.

The formed element 11 is made of an elastic material similar to that of the balls 10, 21, e.g. a material according to AISI 440 A or 330. With a load-bearing ball diameter of ca. 25 mm, the elasticity of the formed element 11 will be sufficient when the thickness of the material is between 0.9 and 1.5 mm, preferably about 1.2 mm.

I claim:

1. Ball unit for a conveyor system, comprising:
a load-bearing ball seated on ball bearings in bearing shell within an essentially radially symmetrical bearing unit and held in said bearing unit by a securing apparatus; said bearing unit comprising a supporting structure for fixing said bearing unit within an opening in a carrier plate such that said ball unit can support a load; said bearing unit further comprising at least one detent for bracing said bearing unit in said opening against a direction of load application; said bearing shell being constructed integrally with said supporting structure, said supporting structure being flange-shaped; wherein, between said bearing shell and said flange-shaped supporting structure a section with an enlarged diameter defines a space for accommodating said securing apparatus such that, between said bearing shell and said section with said enlarged diameter, a transition zone is provided for elastically damping an impact load.

2. Ball unit according to claim 1, wherein the securing apparatus comprises a ring component with a lip section extending radially inwardly such as to define an opening smaller than a diameter of the load-bearing ball, with a flange section extending radially outwardly such that the flange section can rest on an upper surface of the supporting structure, and with a chamfer section extending into the unit.

3. Ball unit according to claim 2, wherein the ring component is held in the formed element by at least one elastic holding device.

4. Ball unit according to claim 3, wherein the at least one elastic holding device comprises a spring washer, and wherein the ring component has a groove around essentially its entire outer circumference, within which the spring washer is seated, enclosing a considerable part of the circumference of the ring component, and wherein a supporting shoulder is provided on the inner surface of the supporting structure, which projects radially inward and with which the spring washer comes into contact.

5. Ball unit according to claim 4, wherein the ring component has an indentation opening upward in the region of the at least one detent, by way of which the at least one detent can be withdrawn into the ring component from above in order to remove the ball unit.

6. Ball unit according to claim 4, wherein an opening is provided in the supporting structures, essentially at a level of the groove in the ring component, and the at least one detent is defined by one end of the spring washer, which is bent so that it projects radially outward through the opening.

7. Ball unit according to claim 6, wherein the opening in the enlarged diameter section is positioned below the flange-shaped supporting structure.

8. Ball unit according to claim 6, wherein an additional locking device is provided as part of the supporting structure.

9. Ball unit according to claim 6, wherein there is an additional opening in the supporting structure essentially opposite to the first opening and essentially at the level of the ring groove, and an additional locking device is formed by an end of the spring washer that is bent to the side so that it extends radially outward through the additional opening.

10. Ball unit according to claim 9, wherein the groove of the ring becomes shallower from the opening for the at least one detent toward the additional opening, so that in the region of the additional opening the spring washer is essentially firmly fixed in the groove, and in the region of the at least one detent the spring washer can be pressed into the groove in order to pull back the detent.

* * * * *

UNITED STATES PATENT AND TRADEMARK OFFICE
CERTIFICATE OF CORRECTION

PATENT NO. : 5,096,308

DATED : March 17, 1992

INVENTOR(S) : Jarl Sundseth

It is certified that error appears in the above-identified patent and that said Letters Patent is hereby corrected as shown below:

ON THE TITLE PAGE:
In the first line of the inventor's address, the word "Rothendaschwet" should read --Rothendaschweg--.

In column 1, line 15, the German patent application number "DE-OS 805494" should be changed to read --DE-OS 3805494--.

Signed and Sealed this

Eighth Day of June, 1993

Attest:

MICHAEL K. KIRK

*Attesting Officer*  *Acting Commissioner of Patents and Trademarks*